United States Patent
Zhang et al.

(10) Patent No.: US 10,671,667 B2
(45) Date of Patent: Jun. 2, 2020

(54) DATA MATCHING METHOD AND APPARATUS AND COMPUTER STORAGE MEDIUM

(71) Applicant: ZHONGXING MICROELECTRONICS TECHNOLOGY CO. LTD, Guangdong (CN)

(72) Inventors: Meng Zhang, Shenzhen (CN); Qinshu Chen, Shenzhen (CN)

(73) Assignee: Sanechips Technology Co., Ltd., Shenzhen, Guangdong (CN)

( * ) Notice: Subject to any disclaimer, the term of this patent is extended or adjusted under 35 U.S.C. 154(b) by 952 days.

(21) Appl. No.: 15/121,547

(22) PCT Filed: May 19, 2014

(86) PCT No.: PCT/CN2014/077824
§ 371 (c)(1),
(2) Date: Sep. 22, 2016

(87) PCT Pub. No.: WO2015/127721
PCT Pub. Date: Sep. 3, 2015

(65) Prior Publication Data
US 2017/0220696 A1    Aug. 3, 2017

(30) Foreign Application Priority Data
Feb. 25, 2014  (CN) .......................... 2014 1 0064599

(51) Int. Cl.
*G06F 16/901* (2019.01)
*G06F 16/903* (2019.01)

(52) U.S. Cl.
CPC ...... *G06F 16/9014* (2019.01); *G06F 16/9017* (2019.01); *G06F 16/9027* (2019.01); *G06F 16/90344* (2019.01)

(58) Field of Classification Search
CPC ............. G06F 16/9014; G06F 16/9017; G06F 16/90344; G06F 16/9027
(Continued)

(56) References Cited

U.S. PATENT DOCUMENTS 6,434,662 B1   8/2002   Greene
7,324,514 B1   1/2008   Haq
(Continued)

FOREIGN PATENT DOCUMENTS

CN   101247337 A   8/2008
CN   101315628 A   12/2008
(Continued)

OTHER PUBLICATIONS

Supplementary European Search Report in European application No. 14884011.9, dated Jan. 18, 2017, 9 pgs.
(Continued)

*Primary Examiner* — Kimberly L Wilson
(74) *Attorney, Agent, or Firm* — Cooper Legal Group, LLC

(57) ABSTRACT

A data matching method includes that: a lookup table is generated according to a content to be searched; hash processing is performed on a keyword to be searched to obtain a hash index value of the keyword to be searched; and a matched content to be searched is found in the lookup table according to the hash index value of the keyword to be searched. Meanwhile, a data matching apparatus is provided.

15 Claims, 2 Drawing Sheets

---

101. A network interconnection device generates a lookup table according to a content to be searched 102. The network interconnection device performs hash processing on a keyword to be searched to obtain a hash index value of the keyword to be searched 103. The network interconnection device finds the matched content to be searched in the lookup table according to the hash index value of the keyword to be searched

(58) Field of Classification Search
USPC .......................................................... 707/747
See application file for complete search history.

(56) References Cited

U.S. PATENT DOCUMENTS

| | | | | |
|---|---|---|---|---|
| 2003/0065774 | A1* | 4/2003 | Steiner | H04L 67/16 709/225 |
| 2008/0279185 | A1 | 11/2008 | Zhang | |
| 2010/0080223 | A1 | 4/2010 | Wong | |
| 2012/0143877 | A1 | 6/2012 | Kumar | |
| 2014/0136762 | A1* | 5/2014 | Li | G06F 12/0246 711/103 |
| 2014/0351273 | A1* | 11/2014 | Yoon | G06F 16/33 707/754 |

FOREIGN PATENT DOCUMENTS

| | | |
|---|---|---|
| CN | 101692651 A | 4/2010 |
| CN | 101894236 A | 11/2010 |
| CN | 102364463 A | 2/2012 |
| CN | 102487374 A | 6/2012 |
| CN | 102571494 A | 7/2012 |
| CN | 102722557 A | 10/2012 |
| CN | 101247337 B | 11/2012 |
| CN | 102364463 B | 7/2013 |
| CN | 103238145 A | 8/2013 |
| EP | 1551141 A1 | 7/2005 |
| EP | 1551141 B1 | 12/2007 |

OTHER PUBLICATIONS

International Search Report in international application No. PCT/CN2014/077824, dated Nov. 6, 2014, 2 pgs.

English Translation of the Written Opinion of the International Search Authority in international application No. PCT/CN2014/077824, dated Nov. 6, 2014, 5 pgs.

"Balanced Trees" In: "Essential Algorithms: A Practical Approach to Computer Algorithms", Rod Stephens, Jul. 25, 2013, John Wiley & Sons Inc, Indianapolis, IN, US, XP055467747, ISBN: 978-1-118-61210-1 vol. 07030201, pp. 277-295.

* cited by examiner

DATA MATCHING METHOD AND APPARATUS AND COMPUTER STORAGE MEDIUM

TECHNICAL FIELD

The present disclosure relates to a data searching technology, and in particular to a data matching method and apparatus and a computer storage medium.

BACKGROUND

In recent years, along with rapid popularization of the Internet and continuous increase of multimedia service demands, a link rate of a network is increased to 100 Gb/s and even higher. In order to design a switching device meeting a network requirement, it is needed to make researches on a high-speed searching algorithm.

At present, devices for high-speed searching usually include a Content Addressable Memory (CAM) and a Ternary Content Addressable Memory (TCAM). Each storage unit of a CAM includes an embedded comparison logic, thus, data written into the CAM may be compared with each piece of internally stored data, and addresses of all internal data the same as the port data may be returned. Generally speaking, a Random Access Memory (RAM) is a storage unit for reading and writing data according to an address. On the contrary, a CAM returns an address matched with a port data content; each bit in a TCAM has three states, including a "0" state, a "1" state and a "don't care" state, which is why the TCAM is "ternary". It is just the third state of the TCAM which enables the TCAM to implement accurate matching searching and fuzzy matching searching. While, the CAM does not have the third state, so that the CAM may only implement accurate matching searching.

The TCAM and the CAM both have the advantages including high searching speed and simplicity in operation, but they also have three obvious defects: high cost, high power consumption and configuration updating complexity.

SUMMARY

In order to solve the existing technical problem, the embodiments of the present disclosure provide a data matching method and apparatus and a computer storage medium.

The technical solutions of the embodiments of the present disclosure are implemented as follows.

An embodiment of the present disclosure provides a data matching method, which may include that: a lookup table is generated according to a content to be searched; hash processing is performed on a keyword to be searched to obtain a hash index value of the keyword to be searched; and a matched content to be searched is found in the lookup table according to the hash index value of the keyword to be searched.

An embodiment of the present disclosure provides a data matching apparatus, which may include: a control unit, a searching unit and a lookup table generation unit, wherein the lookup table generation unit may be configured to generate a lookup table according to a content to be searched, and send the generated lookup table to the searching unit;

the control unit may be configured to perform hash processing on a keyword to be searched to obtain a hash index value of the keyword to be searched, and send the obtained hash index value of the keyword to be searched to the searching unit; and the searching unit may be configured to find a matched content to be searched in the lookup table according to the hash index value of the keyword to be searched.

An embodiment of the present disclosure further provides a computer storage medium, which has stored a computer program for executing the abovementioned data matching method.

According to the data matching method and apparatus and the computer storage medium provided by the present disclosure, a lookup table is generated according to a content to be searched; hash processing is performed on a keyword to be searched to obtain a hash index value of the keyword to be searched; a matched content to be searched is found in the lookup table according to the hash index value of the keyword to be searched. In such a manner, cost and power consumption of equipment may be reduced. The lookup table adopts a treelike structure, so that a memory is saved, and no redundant entries are needed to store searched contents which may cause hash conflicts.

Figure 1:
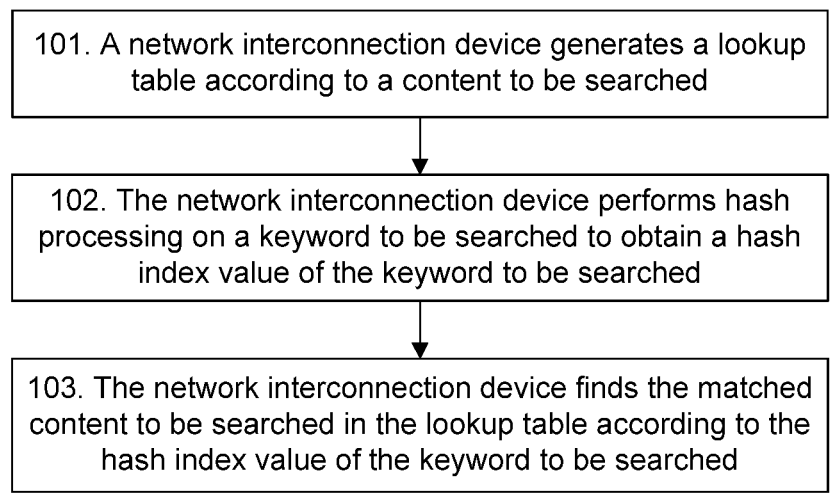
FIG. 1 is a flowchart of a data matching method according to embodiment 1 of the present disclosure.

In the drawings: 1, control unit; 2, searching unit; and 3, lookup table generation unit.

DETAILED DESCRIPTION

In the embodiments of the present disclosure, a lookup table is generated according to a content to be searched; hash processing is performed on a keyword to be searched to obtain a hash index value of the keyword to be searched; and the matched content to be searched is found in the lookup table according to the hash index value of the keyword to be searched.

The present disclosure will be further described below with reference to the drawings and specific embodiments in detail.

Embodiment 1

The embodiment of the present disclosure implements a data matching method. As shown in FIG. 1, the method is specifically implemented by the following steps.

Step 101: A network interconnection device generates a lookup table according to a content to be searched.

Specifically, the network interconnection device performs hash processing on a searching keyword of the content to be searched to obtain a hash index value of the searching keyword of the content to be searched; all searching keywords with the same hash index value are taken as an entry; the entry is constructed into a treelike structure, and all entries form the lookup table. Here, each node in the entries with the treelike structures include a key value of a searching keyword and indication information indicating whether the node is a root node or a leaf node; the key value is a numerical value, of a binary system or another numerical system, corresponding to the searching keyword; the indication information may be 1-bit; and the searching keyword is for determining a matched searched content, and is also for determining a searching path. The network interconnection device may also a device for network connection, such as a switch or a router.

Figure 2:
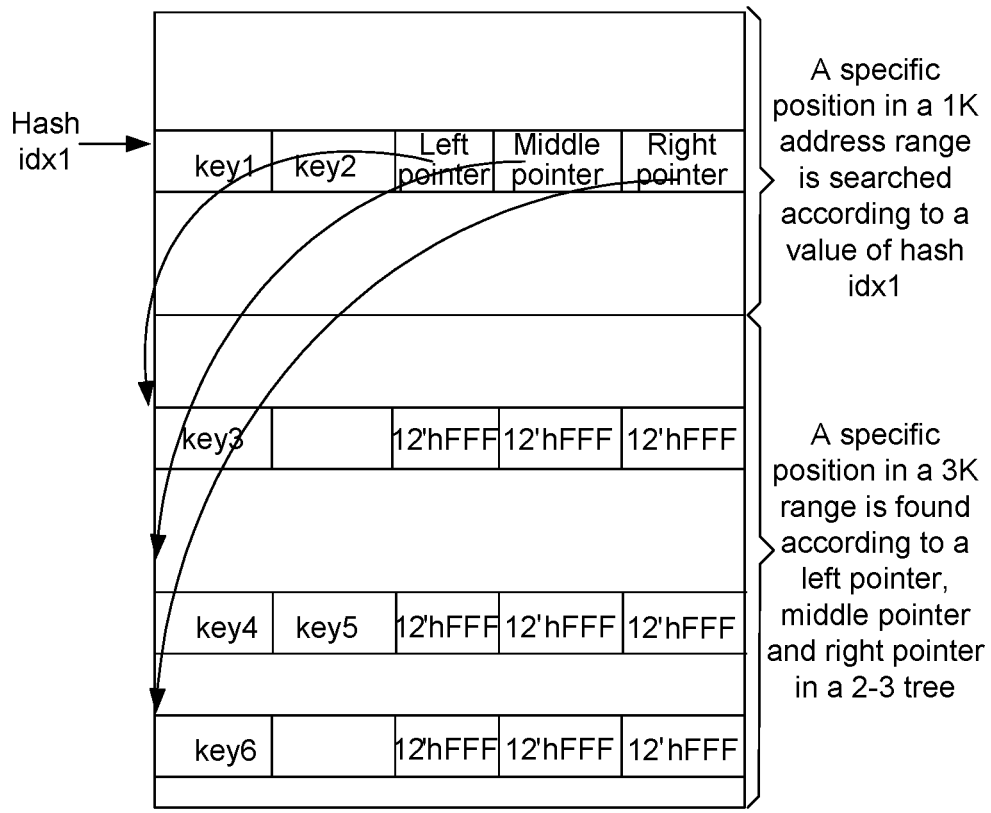
FIG. 2 is a structure diagram of a lookup table according to embodiment 1 of the present disclosure.

The treelike structure may be a treelike structure such as a 2-3 tree, a binary tree and a multi-way tree. The 2-3 tree is taken as an example here. As shown in FIG. 2, hash processing is performed on a first searching keyword key1, a second searching keyword key2, a third searching keyword key3, a fourth searching keyword key4, a fifth searching keyword key5 and a sixth searching keyword key6. It is supposed that the same hash index value is obtained, then the key1, key2, key3, key4, key5 and key6 are taken as an entry of a lookup table, and the hash index value of the entry is hash idx1, wherein key values of the key1, key2, key3, key4, key5 and key6 are sequenced from small to large as follows: key3<key1<key4<key5<key2<key6; arrays corresponding to the key values are sequenced from small to large as follows: a[0]<a[1]<a[2]<a[3]<a[4]<a[5]; a left endpoint and a right endpoint of a root node are extracted from the sequenced arrays, wherein the array obtained by subtracting 1 from the total number of the searching keywords, dividing the difference by 3 and rounding the quotient is taken as the left endpoint, that is, $(6-1)\div 3=1$, a[1] is selected as the left endpoint; the array obtained by subtracting 1 from the total number of the searching keywords, multiplying the difference by 2, dividing the product by 3, rounding the quotient and adding 1 is taken as the right endpoint, that is, $\{(6-1)\times 2\div 3\}+1=4$, a[4] is selected as the right endpoint. Moreover, the root node further includes a left pointer, a middle pointer and a right pointer. A node of a left sub-tree of the root node includes the key value of key3 and halt instruction information; a node of a middle sub-tree of the root node includes the key value of key4, the key value of key5 and halt instruction information; and a node of a right sub-tree of the root node includes the key value of key6 and halt instruction information. The left pointer of the root node points to the node of the left sub-tree, the middle pointer points to the node of the middle sub-tree, the right pointer points to the node of the right sub-tree, and the halt instruction information indicates stopping a current searching flow. The halt instruction information is 12'hFFF, wherein the 12'hFFF is a manner of representing a hex system in a syntax of verilog, and represents 12 bits, each bit being 1. During searching in the 2-3 tree, a specific position in a 1K address range is searched according to a value of hash idx1, and a specific position in a 3K range is found according to the left pointer, middle pointer and right pointer in the 2-3 tree.

Step 102: the network interconnection device performs hash processing on a keyword to be searched to obtain a hash index value of the keyword to be searched.

Specifically, the network interconnection device determines the keyword to be searched according to a field of keyword to be searched in a data packet, and performs hash processing on the obtained keyword to be searched to obtain a hash index value, with a reduced bit width, of the keyword to be searched by virtue of a hash function; and the hash function may be a function capable of processing multi-bit data into few-bit data and making the few-bit data distributed relatively uniformly. For example, a polynomial may be generated through a Cyclic Redundancy Check (CRC).

Here, the operation that the network interconnection device determines the keyword to be searched according to the field of keyword to be searched in the data packet may be implemented as follows: the field of keyword to be searched is extracted from the data packet, a database is searched for a name corresponding to the field of keyword to be searched according to the field of keyword to be searched, wherein the name is the keyword to be searched of the field of keyword to be searched; the field of keyword to be searched includes key information in the data packet such as source and destination hardware addresses, a Virtual Local Area Network (VLAN) and priority; the keyword to be searched is unique, and marks the field of keyword to be searched; a width of the keyword to be searched is N-bit; when the width of the keyword to be searched is shorter than N bits, 0 is supplemented in front of the width of the keyword to be searched to enable the width of the keyword to be searched to reach a bit width specified by a corresponding entry in the lookup table.

Step 103: the network interconnection device finds the matched content to be searched in the lookup table according to the hash index value of the keyword to be searched.

Specifically, the network interconnection device finds the corresponding entry in the lookup table by taking the hash index value of the keyword to be searched as an address, determines a position of a searching keyword matched with the keyword to be searched in a treelike structure of the entry according to a key value of the keyword to be searched, finds the searching keyword with a key value equal to that of the keyword to be searched at the determined position, and executes the content to be searched corresponding to the searching keyword; wherein the key value is a numerical value, corresponding to the keyword to be searched, of a binary system or another numerical system.

Specifically, the network interconnection device compares the key value of the keyword to be searched with the key value of the searching key value in a node of the treelike structure of the entry, and when the key value of the keyword to be searched is equal to the key value of the searching keyword in the node, the searching keyword of the node is the same as the keyword to be searched, and the content to be searched corresponding to the searching keyword is read.

In the embodiment, in order to rapidly find the matched content to be searched in the treelike structure, the network interconnection device may adopt at least two hash functions to perform hash processing on the obtained keyword to be searched to obtain at least two different hash index values of the keyword to be searched, and meanwhile, searches at least two entries in the lookup table for the matched content to be searched.

Figure 3:
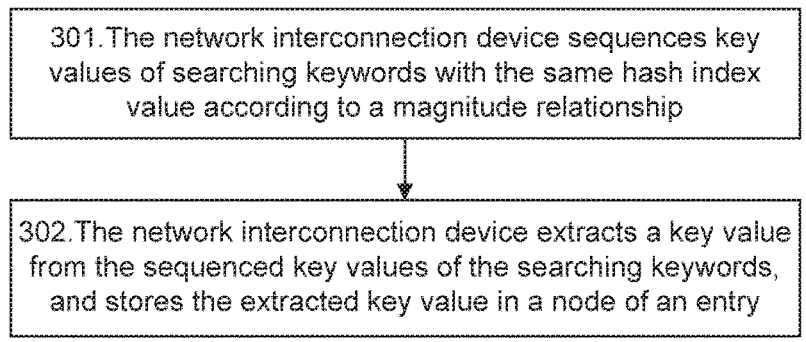
FIG. 3 is a flowchart of generating a lookup table according to embodiment 1 of the present disclosure.

The step that the network interconnection device generates the lookup table according to the content to be searched, as shown in FIG. 3, includes the following steps.

Step 301: the network interconnection device sequences key values of searching keywords with the same hash index value according to a magnitude relationship.

Here, the network interconnection device generates an entry of the lookup table by the obtained key values of the searching keywords with the same hash index value; key values of searching keywords with different hash index values generate multiple entries; and the multiple entries are combined to generate the lookup table; and key values of all keywords to be searched in each entry are sequenced from small to large, and the sequenced key vales are arranged in an array.

For example, a data structure of the lookup table is a 2-3 tree, and the array is recorded as a[n], wherein n is obtained by subtracting 1 from the total number of the searching keywords.

Step 302: the network interconnection device extracts a key value from the sequenced key values of the searching keywords, and stores the extracted key value in a node of an entry.

Here, a highest layer of each entry of the lookup table is a root layer, and is recorded as a first layer; a lower layer of the root layer is a second layer, and serial numbers of other layers are sequentially increased. A key value of each node of each layer is extracted from an array; left and right endpoints are extracted from the arrays; a key value obtained by subtracting 1 from the total number of the searching keywords in an array, dividing the difference by 3 and rounding the quotient is taken as a left endpoint; a key value obtained by subtracting 1 from the total number of the searching keywords in the array, multiplying the difference by 2, dividing the product by 3, rounding the quotient and adding 1 is taken as a right endpoint; and the remaining key values of the array are divided into three segmented arrays, wherein a right endpoint of the first segmented array is smaller than a left endpoint of the second segmented array, a left endpoint of the third segmented array is larger than a right endpoint of the second segmented array, left and right endpoints of a node of a lower layer are extracted from the three segmented arrays respectively, the remaining key values of each segment of the array are further divided into three segmented arrays, and the operation is sequentially cycled until only two or fewer than two key values are left in each segmented array.

For example, when a data structure of each entry of the lookup table is a 2-3 tree, key values are extracted from the sequenced key values of the searching keywords, and the extracted key values are stored in nodes of the 2-3 tree of the entry; left and right endpoints of each node of a first layer are extracted from array $a[n]$; $a[i]$ is taken as the left endpoint, and $a[j]$ is taken as the right endpoint, wherein i is obtained by rounding $n/3$ and j is obtained by rounding $2n/3$ and adding 1; after the left and right endpoints are extracted, other key values of array $a[n]$ are divided into three segmented arrays $a[n1]$, $a[n2]$ and $a[n3]$, wherein $a[n1]$ is the first segmented array smaller than $a[i]$, $a[n3]$ is the second segmented array larger than $a[j]$, and $a[n2]$ is the third segmented array between $a[i]$ and $a[j]$; left and right endpoints of arrays $a[n1]$, $a[n2]$ and $a[n3]$ are extracted respectively, each array is further divided into three segmented arrays after the left and right endpoints are respectively extracted in a manner of extracting the left and right endpoints from array $a[n]$, and left and right endpoints are repeatedly extracted in such a manner until only two or fewer than two endpoints are left in each array;

the generated entries adopting the 2-3 structure are stored in a lookup table storage area and a backup lookup table storage area, and contents to be searched corresponding to each node of each entry are stored in the lookup table; and the generated lookup table may be stored in a Static Random Access Memory (SRAM), and the SRAM may reduce cost and power consumption under the condition of application of a high-speed searching algorithm, and may also meet a high-rate requirement of a network.

Figure 4:
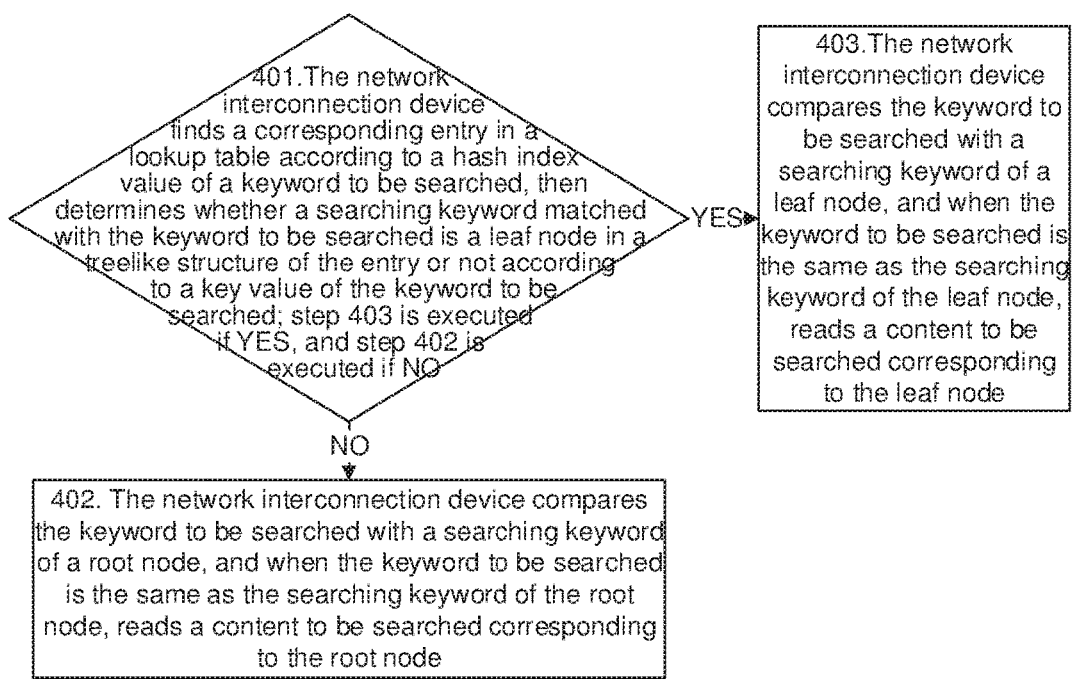
FIG. 4 is a flowchart of searching a lookup table for a matched entry according to embodiment 1 of the present disclosure.
Figure 5:
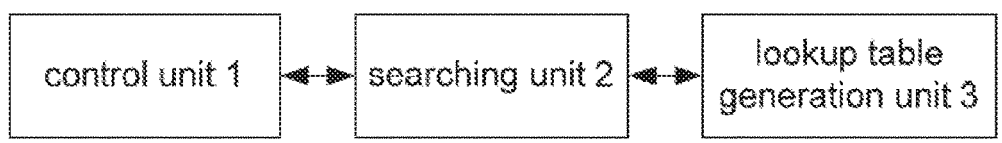
FIG. 5 is a structure diagram of a data matching apparatus according to embodiment 2 of the present disclosure.

The step that network interconnection device finds the matched content to be searched in the lookup table according to the hash index value of the keyword to be searched, as shown in FIG. 4, is specifically implemented by the following steps.

Step 401: the network interconnection device finds a corresponding entry in the lookup table according to the hash index value of the keyword to be searched, then determines whether a searching keyword matched with the keyword to be searched is a leaf node in a treelike structure of the entry or not according to the key value of the keyword to be searched; if it is a leaf node, step 403 is then executed, and otherwise, step 402 is executed.

Step 402: the network interconnection device compares the keyword to be searched with a searching keyword of a root node, and when the keyword to be searched is the same as the searching keyword of the root node, reads a content to be searched corresponding to the root node.

Here, the network interconnection device compares the key value of the keyword to be searched with key values corresponding to endpoints of the searching keyword in the root node; if the key value of the keyword to be searched is smaller than the key value corresponding to the left endpoint of the searching keyword, the network interconnection device reads a left pointer of the root node and reads a node corresponding to the left pointer; if the key value of the keyword to be searched is larger than the key value corresponding to the left endpoint of the searching keyword but smaller than the key value corresponding to the right endpoint of the searching keyword, the network interconnection device extracts a middle pointer of the root node and reads a node corresponding to the middle pointer; if the key value of the keyword to be searched is larger than the key value corresponding to the right endpoint of the searching keyword, the network interconnection device extracts a right pointer of the root node, reads a node corresponding to the right pointer and judges whether the corresponding node is a leaf node or not; if the corresponding node is a leaf node, step 403 is then executed; if the corresponding node is not a leaf node, step 402 is executed again on the corresponding node; and if the key value of the keyword to be searched is equal to the key value corresponding to the left endpoint or right endpoint of the searching keyword, the network interconnection device accurately matches the content to be searched according to the keyword to be searched, and executes operation corresponding to the left endpoint or the right endpoint.

Step 403: the network interconnection device compares the keyword to be searched with a searching keyword of a leaf node, and when the keyword to be searched is the same as the searching keyword of the leaf node, reads a content to be searched corresponding to the leaf node.

Here, the network interconnection device compares the key value of the keyword to be searched with key values corresponding to endpoints of the searching keyword in the leaf node; if the key value of the keyword to be searched is equal to the key value corresponding to the left endpoint of the searching keyword, the network interconnection device determines that the keyword to be searched has been accurately matched with operation corresponding to the left endpoint, otherwise, the network interconnection device compares the key value of the keyword to be searched with the key value corresponding to the right endpoint of the searching keyword, determines that the keyword to be searched has been accurately matched with operation corresponding to the right endpoint if they are equal, and if the key value of the keyword to be searched is unequal to both the key values corresponding to the left and right endpoints of the searching keyword in the leaf node, the network interconnection device ends searching and determines that there is no content to be searched corresponding to the keyword to be searched in the lookup table.

Here, the determination about the leaf node may be confirmed according to indication information included by the node.

In order to increase a searching speed, a searching depth may not exceed two layers, and then a 2-3 tree corresponding to each hash value to be searched may accommodate 8 hash conflicts. In order to accommodate more conflicts, at least two hash functions may be adopted, contents to be searched are divided into a plurality of groups, each group corresponds to a hash function, and for the contents of each group, hash index values of keywords to be searched are calculated by respective hash functions; and hash processing is performed on the hash index values of the keywords to be searched according to the at least two hash functions, and at least two entries of the lookup table are further generated. During searching, the at least two entries of the lookup table are searched in parallel, so that the searching speed is increased.

When the generated lookup table is needed to be updated, the data structure of the lookup table is regulated by adding or deleting searching keywords in the lookup table, a processor starts configuring a backup lookup table according to a new lookup table, the processor makes a request of switching to the backup lookup table for searching after updating the backup lookup table, an interrupt is reported to the processor after switching, and the processor starts updating the lookup table after receiving the interrupt, and makes a request of switching from the backup lookup table to the new lookup table for searching after finishing updating the lookup table; and updating includes data modification, addition or deletion.

Embodiment 2

The embodiment of the present disclosure provides a data matching apparatus, and as shown in FIG. 9, the apparatus includes a control unit 1, a searching unit 2 and a lookup table generation unit 3, wherein the lookup table generation unit 3 generates a lookup table according to a content to be searched.

Specifically, the lookup table generation unit 3 performs hash processing on a searching keyword of the content to be searched to obtain a hash index value of the searching keyword of the content to be searched; all searching keywords with the same hash index value are taken as an entry; the entry is constructed into a treelike structure, and all entries form the lookup table, wherein each node in an entry of the treelike structure includes a key value of a searching keyword and indication information indicating whether the node is a root node or a leaf node; the key value is a numerical value, of a binary system or another numerical system, corresponding to the searching keyword; the indication information may be 1-bit, and the searching keyword is for determining a matched searched content, and is also for determining a searching path.

The control unit 1 performs hash processing on a keyword to be searched to obtain a hash index value of the keyword to be searched.

Specifically, the control unit 1 determines the keyword to be searched according to a field of keyword to be searched in a data packet, and performs hash processing on the obtained keyword to be searched to obtain a hash index value, with a reduced bit width, of the keyword to be searched by virtue of a hash function, wherein the operation that the keyword to be searched is determined according to the field of keyword to be searched in the data packet may be implemented as follows: the field of keyword to be searched is extracted from the data packet, a database is searched for a name corresponding to the field of keyword to be searched according to the field of keyword to be searched, wherein the name is the keyword to be searched of the field of keyword to be searched, and the field of keyword to be searched includes key information in the data packet such as source and destination hardware addresses, a VLAN and a priority; the keyword to be searched is unique, and identifies the corresponding field of keyword to be searched; a width of the keyword to be searched is N-bit, and when the width of the keyword to be searched is shorter than N bits, 0 is supplemented in front of the width of the keyword to be searched to enable the width of the keyword to be searched to reach a bit width specified by a corresponding entry in the lookup table.

In the embodiment, in order to rapidly find the matched content to be searched in data of the treelike structure, the control unit 1 adopts at least two hash functions to perform hash processing on the obtained keyword to be searched to obtain at least two different hash index values of the keyword to be searched.

The searching unit 2 finds the matched content to be searched in the lookup table according to the hash index value of the keyword to be searched.

Specifically, the searching unit 2 finds the corresponding entry in the lookup table by taking the hash index value of the keyword to be searched as an address, determines a position of a searching keyword matched with the keyword to be searched in a treelike structure of the entry according to a key value of the keyword to be searched, finds the searching keyword with a key value equal to that of the keyword to be searched at the determined position, and executes the content to be searched corresponding to the searching keyword.

The lookup table generation unit 3 is specifically configured to sequence key values of searching keywords with the same hash index value according to a magnitude relationship, arrange the sequenced key values in an array, for example, the array being recorded as a[n] when a data structure of the lookup table is a 2-3 tree, extract a key value from the sequenced key values of the keywords to be searched and store the extracted key value in a node of the 2-3 tree of the entry.

The lookup table generation unit 3 stores the generated entries adopting the 2-3 structure in a lookup table storage area and a backup lookup table storage area, and contents to be searched corresponding to each node of each entry are stored in the lookup table; and the generated lookup table may be stored in an SRAM, and the SRAM may reduce cost and power consumption under the condition of application of a high-speed searching algorithm, and may also meet a high-rate requirement of a network.

The searching unit 2 is specifically configured to find a corresponding entry in the lookup table according to the hash index value of the keyword to be searched, then determine whether a searching keyword matched with the keyword to be matched is a leaf node in a treelike structure of the entry or not according to the key value of the keyword to be searched, compare the key value of the keyword to be searched with a key value of a searching keyword in a root node if the node is not a leaf node, and read a content to be searched corresponding to the root node when the key value of the keyword to be searched is the same as the key value of the searching keyword in the root node; and if the node is a leaf node, compare the key value of the keyword to be searched with a key value of a searching keyword in the leaf node, and read a content to be searched corresponding to the leaf node when the key value of the keyword to be searched is the same as the key value of the searching keyword in the leaf node.

The lookup table generation unit 3 regulates a data structure of the lookup table according to a new searching keyword when the generated lookup table is needed to be updated, including: configuring a backup lookup table according to a new lookup table, making a request of switching to the backup lookup table for searching after updating the backup lookup table, and reporting an interrupt to the processor after switching; and the control unit 1 starts updating the lookup table after receiving the interrupt, and makes a request of switching from the backup lookup table to the new lookup table for searching after finishing updating the lookup table. Updating includes data modification, addition or deletion.

The control unit 1 may be a processor of a network interconnection device, the searching unit 2 may be an SRAM of the network interconnection device, and the lookup table generation unit 2 may be the processor of the network interconnection device.

If a software function module is adopted for implementing the data matching method of the embodiment of the present disclosure and sold or used as an independent product, the software function module may also be stored in a computer-readable storage medium. Based on such understanding, those skilled in the art should know that the embodiments of the present disclosure may be provided as a method, a system or a computer program product. Therefore, the present disclosure may adopt a form of a pure hardware embodiment, a pure software embodiment or a combined software and hardware embodiment. Moreover, the present disclosure may adopt a form of a computer program product implemented on one or more computer-available storage media including computer-available program codes, the storage media including, but not limited to, a U disk, a mobile hard disk, a Read-Only Memory (ROM), a disk memory, a Compact Disc Read-Only Memory (CD-ROM), an optical memory and the like.

The present disclosure is described with reference to flowcharts and/or block diagrams of the method, equipment (system) and computer program product according to the embodiments of the present disclosure. It should be understood that each flow and/or block in the flowcharts and/or the block diagrams and combinations of the flows and/or blocks in the flowcharts and/or the block diagrams may be implemented by computer program instructions. These computer program instructions may be provided for a universal computer, a dedicated computer, an embedded processor or a processor of other programmable data processing equipment to generate a machine, so that a device for realizing a function specified in one flow or more flows in the flowcharts and/or one block or more blocks in the block diagrams is generated by the instructions executed through the computer or the processor of the other programmable data processing equipment.

These computer program instructions may also be stored in a computer-readable memory capable of guiding the computer or other programmable data processing equipment to work in a specific manner, so that a product including an instruction device may be generated by the instructions stored in the computer-readable memory, the instruction device realizing the function specified in one flow or many flows in the flowcharts and/or one block or many blocks in the block diagrams.

These computer program instructions may further be loaded onto the computer or other programmable data processing equipment, so that a series of operating steps are executed on the computer or other programmable data processing equipment to generate processing implemented by the computer, and steps for realizing the function specified in one flow or many flows in the flowcharts and/or one block or many blocks in the block diagrams are provided by the instructions executed on the computer or other programmable data processing equipment.

Correspondingly, the embodiments of the present disclosure further provide a computer storage medium, in which a computer program is stored, the computer program being configured to execute the data matching method of the embodiment of the present disclosure.

The above are only the preferred embodiments of the present disclosure and not intended to limit the scope of protection of the present disclosure. Any modifications, equivalent replacements, improvements and the like made within the spirit and principle of the present disclosure shall fall within the scope of protection of the present disclosure.

The invention claimed is:

1. A method for data matching, comprising:
   generating a lookup table according to a content to be searched;
   performing hash processing on a keyword to be searched to obtain a hash index value of the keyword to be searched; and
   finding a matched content to be searched in the lookup table according to the hash index value of the keyword to be searched,
   wherein generating the lookup table according to the content to be searched comprises:
      performing hash processing on at least one searching keyword of the content to be searched to obtain a hash index value of the at least one searching keyword of the content to be searched;
      employing all searching keywords with a same hash index value as an entry;
      constructing the entry into a 2-3 tree structure; and
      forming the lookup table by all entries.

2. The method according to claim 1, wherein performing hash processing on the keyword to be searched comprises:
   performing hash processing on the keyword to be searched to obtain at least two different hash index values of the keyword to be searched through at least two hash functions.

3. The method according to claim 1, wherein finding the matched content to be searched in the lookup table according to the hash index value of the keyword to be searched comprises:
   finding a corresponding entry in the lookup table by taking the hash index value of the keyword to be searched as an address;
   determining a position of a searching keyword matched with the keyword to be searched in a treelike structure of the corresponding entry according to a key value of the keyword to be searched;
   finding the searching keyword with a key value equal to the key value of the keyword to be searched at the determined position; and
   executing a content to be searched corresponding to the searching keyword.

4. The method according to claim 3, wherein finding the searching keyword with the key value equal to the key value of the keyword to be searched at the determined position and executing the content to be searched corresponding to the searching keyword comprises:
   comparing the key value of the keyword to be searched with a key value of a searching keyword in a node of the treelike structure of the corresponding entry; and when the key value of the keyword to be searched is equal to the key value of the searching keyword in the node, determining that the searching keyword of the node is the same as the keyword to be searched and reading the content to be searched corresponding to the searching keyword.

5. An apparatus for data matching, comprising:
a processor; and
a memory for storing at least one program executable by the processor,
wherein the program, when executed by the processor, is configured to:
generate a lookup table according to a content to be searched, and send the generated lookup table to the searching unit;
perform hash processing on a keyword to be searched to obtain a hash index value of the keyword to be searched; and
find a matched content to be searched in the lookup table according to the hash index value of the keyword to be searched,
wherein the program, when executed by the processor, is configured to perform hash processing on at least one searching keyword of the content to be searched to obtain a hash index value of the at least one searching keyword of the content to be searched, employ all searching keywords with a same hash index value as an entry, construct the entry into a 2-3 tree structure, and form the lookup table by all entries.

6. The apparatus according to claim 5, wherein the program, when executed by the processor, is configured to perform hash processing on the keyword to be searched to obtain at least two different hash index values of the keyword to be searched through at least two hash functions.

7. The apparatus according to claim 5, wherein the program, when executed by the processor, is configured to find a corresponding entry in the lookup table by taking the hash index value of the keyword to be searched as an address, determine a position of a searching keyword matched with the keyword to be searched in a treelike structure of the corresponding entry according to a key value of the keyword to be searched, find the searching keyword with a key value equal to the key value of the keyword to be searched at the determined position, and execute a content to be searched corresponding to the searching keyword.

8. The apparatus according to claim 7, wherein the program, when executed by the processor, is configured to compare the key value of the keyword to be searched with a key value of a searching keyword in a node of the treelike structure of the corresponding entry, and when the key value of the keyword to be searched is equal to the key value of the searching keyword in the node, determine that the searching keyword of the node is the same as the keyword to be searched and read the content to be searched corresponding to the searching keyword.

9. A non-volatile computer-readable storage medium, storing a computer program for executing a data matching method comprising:
generating a lookup table according to a content to be searched;
performing hash processing on a keyword to be searched to obtain a hash index value of the keyword to be searched; and
finding a matched content to be searched in the lookup table according to the hash index value of the keyword to be searched,
wherein the non-volatile computer-readable storage medium stores the computer program for executing the data matching method further comprising:
performing hash processing on at least one searching keyword of the content to be searched to obtain a hash index value of the at least one searching keyword of the content to be searched;
employing all searching keywords with a same hash index value as an entry;
constructing the entry into a 2-3 tree structure; and
forming the lookup table by all entries.

10. The method according to claim 3, wherein performing hash processing on the keyword to be searched comprises:
performing hash processing on the keyword to be searched to obtain at least two different hash index values of the keyword to be searched through at least two hash functions.

11. The apparatus according to claim 7, wherein the program, when executed by the processor, is configured to perform hash processing on the keyword to be searched to obtain at least two different hash index values of the keyword to be searched through at least two hash functions.

12. The non-volatile computer-readable storage medium according to claim 9, wherein the non-volatile computer-readable storage medium stores the computer program for executing the data matching method further comprising:
performing hash processing on the keyword to be searched to obtain at least two different hash index values of the keyword to be searched through at least two hash functions.

13. The non-volatile computer-readable storage medium according to claim 9, wherein the non-volatile computer-readable storage medium stores the computer program for executing the data matching method further comprising:
finding a corresponding entry in the lookup table by taking the hash index value of the keyword to be searched as an address;
determining a position of a searching keyword matched with the keyword to be searched in a treelike structure of the corresponding entry according to a key value of the keyword to be searched;
finding the searching keyword with a key value equal to the key value of the keyword to be searched at the determined position; and
executing a content to be searched corresponding to the searching keyword.

14. The non-volatile computer-readable storage medium according to claim 13, wherein the non-volatile computer-readable storage medium stores the computer program for executing the data matching method further comprising:
performing hash processing on the keyword to be searched to obtain at least two different hash index values of the keyword to be searched through at least two hash functions.

15. The non-volatile computer-readable storage medium according to claim 13, wherein the non-volatile computer-readable storage medium stores the computer program for executing the data matching method further comprising:
comparing the key value of the keyword to be searched with a key value of a searching keyword in a node of the treelike structure of the corresponding entry; and
when the key value of the keyword to be searched is equal to the key value of the searching keyword in the node, determining that the searching keyword of the node is the same as the keyword to be searched and reading the content to be searched corresponding to the searching keyword.

* * * * *